United States Patent
Wagner et al.

(10) Patent No.: US 10,003,186 B2
(45) Date of Patent: Jun. 19, 2018

(54) VARIABLE-SPEED CONSTANT-FREQUENCY POWER CONTROL

(71) Applicant: Hamilton Sundstrand Corporation, Charlotte, NC (US)

(72) Inventors: Carl A. Wagner, Beloit, WI (US); Mustansir Kheraluwala, Lake Zurich, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 36 days.

(21) Appl. No.: 15/182,782

(22) Filed: Jun. 15, 2016

(65) Prior Publication Data
US 2017/0365993 A1    Dec. 21, 2017

(51) Int. Cl.
| | |
|---|---|
| H02P 7/00 | (2016.01) |
| H02H 7/06 | (2006.01) |
| B60R 16/03 | (2006.01) |
| B64D 41/00 | (2006.01) |
| H02P 9/30 | (2006.01) |
| H02H 7/122 | (2006.01) |
| H02M 5/458 | (2006.01) |
| H02P 9/00 | (2006.01) |
| H02P 9/14 | (2006.01) |

(52) U.S. Cl.
CPC ............. *H02H 7/06* (2013.01); *B60R 16/03* (2013.01); *B64D 41/00* (2013.01); *H02H 7/122* (2013.01); *H02M 5/458* (2013.01); *H02P 9/006* (2013.01); *H02P 9/14* (2013.01); *H02P 9/305* (2013.01); *B64D 2221/00* (2013.01)

(58) Field of Classification Search
CPC ...... H02P 7/34; Y02T 10/7077; Y02T 10/725; F02N 11/0848; F02N 11/08; F02N 11/04
USPC .................. 318/140, 143, 798, 800, 801
See application file for complete search history.

(56) References Cited

U.S. PATENT DOCUMENTS

| | | | |
|---|---|---|---|
| 4,403,292 A | 9/1983 | Ejzak et al. | |
| 4,456,830 A * | 6/1984 | Cronin | F02N 11/04 123/179.27 |
| 4,862,341 A * | 8/1989 | Cook | H02J 3/01 290/36 R |
| 4,937,462 A * | 6/1990 | Recker | H02J 3/42 307/19 |
| 4,937,720 A | 6/1990 | Kirchberg | |
| 4,937,723 A | 6/1990 | Rozman et al. | |
| 4,956,598 A | 9/1990 | Recker et al. | |
| 5,117,174 A * | 5/1992 | Kessler | H02P 9/30 322/21 |

(Continued)

OTHER PUBLICATIONS

Extended European Search Report for Application No. 17174956.7-1809 dated Nov. 10, 2017 (8 pp.).

*Primary Examiner* — Rina Duda
(74) *Attorney, Agent, or Firm* — Cantor Colburn LLP

(57) ABSTRACT

A variable-speed constant-frequency (VSCF) power converter includes a generator control operable to regulate an output voltage of a variable frequency generator at a variable frequency. The VSCF power generator also includes an inverter control operable to regulate a VSCF output voltage at a point-of-regulation at a constant frequency, where the generator control and the inverter control independently control a main line contactor of the point-of-regulation to provide redundant fault protection for an aircraft use.

20 Claims, 5 Drawing Sheets

(56) References Cited

U.S. PATENT DOCUMENTS

| | | | |
|---|---|---|---|
| 5,317,500 A | | 5/1994 | Iden et al. |
| 5,438,502 A | | 8/1995 | Rozman et al. |
| 5,559,689 A | * | 9/1996 | Kirchberg .............. G01R 23/00 |
| | | | 363/132 |
| 5,587,641 A | | 12/1996 | Rozman |
| 5,737,196 A | * | 4/1998 | Hughes ................ H02M 5/458 |
| | | | 363/37 |
| 5,798,631 A | | 8/1998 | Spee et al. |
| 6,778,414 B2 | | 8/2004 | Chang et al. |
| 6,844,706 B2 | | 1/2005 | Pinkerton et al. |
| 8,039,983 B2 | * | 10/2011 | Cote ........................ H02P 9/04 |
| | | | 290/32 |
| 8,304,927 B2 | * | 11/2012 | Cote ........................ H02P 9/04 |
| | | | 290/32 |
| 8,525,489 B2 | | 9/2013 | Ahn et al. |
| 8,836,293 B1 | | 9/2014 | Rozman et al. |
| 2012/0013177 A1 | * | 1/2012 | Krenz ...................... H02J 4/00 |
| | | | 307/9.1 |

* cited by examiner

VARIABLE-SPEED CONSTANT-FREQUENCY POWER CONTROL

BACKGROUND

This disclosure relates to generator systems, and more particularly to variable-speed constant-frequency power control using a variable frequency generator.

To produce electric power, aircraft typically use generators coupled to engines located on the wings. Different types of generators have been used that have varying levels of complexity and output power characteristics. Aircraft engines are normally used over a wide range of operating conditions in the air, including takeoff, cruise, descent, and landing. This demands that the engines operate over a range of rotating speeds. Previous generators required constant speed inputs for producing power and use mechanisms including constant speed drives and integrated drive generators. Such devices include heavy hydro-mechanical devices that are coupled to an input shaft rotating at varying input speeds (indexed to the engine speed) and deliver power to an output shaft that rotates at a constant speed, despite the varying input. The heavy hydro-mechanical devices may add unwanted loads to the wings of the aircraft.

Engine coupled generators having speeds directly indexed to an engine operate over the same wide range of operating speeds as the engine. These types of generators are frequently called variable frequency generators (VFGs). It is typical for the requirements and design of wound field type electrical power generators to deliver the same output power, current, and voltage over the entire wide speed range of the input speed. In a constant frequency generation system that conditions power from a VFG, control electronics typically employ static switch timing. Tightly coupled control of the VFG with power conversion control may increase the risk of faults or component defects producing abnormally high generator output voltages and/or other performance issues.

BRIEF DESCRIPTION

According to a non-limiting embodiment, a variable-speed constant-frequency (VSCF) power converter includes a generator control operable to regulate an output voltage of a variable frequency generator at a variable frequency. The VSCF power converter also includes an inverter control operable to regulate a VSCF output voltage at a point-of-regulation at a constant frequency, where the generator control and the inverter control independently control a main line contactor of the point-of-regulation to provide redundant fault protection for an aircraft use.

According to another non-limiting embodiment, a VSCF power generating system includes a variable frequency generator and a VSCF power converter in an aircraft power panel. The VSCF power converter includes a generator control operable to regulate an output voltage of the variable frequency generator at a variable frequency. The VSCF power converter also includes an inverter control operable to regulate a VSCF output voltage at a point-of-regulation of the aircraft power panel at a constant frequency, where the generator control and the inverter control independently control a main line contactor of the point-of-regulation to provide redundant fault protection for an aircraft use.

According to a further non-limiting embodiment, a method of controlling a VSCF power converter includes regulating an output voltage of a variable frequency generator at a variable frequency by a generator control of the VSCF power converter. A VSCF power converter output voltage is regulated at a point-of-regulation at a constant frequency by an inverter control of the VSCF power converter. The method further includes independently controlling a main line contactor of the point-of-regulation by the generator control and the inverter control to provide redundant fault protection for an aircraft use.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

According to a non-limiting embodiment, a variable-speed constant-frequency (VSCF) power system is provided with independent control and monitoring of generator excitation current control, and inverter control to improve failure modes, and enhance point-of-regulation (POR) voltage power quality. In embodiments, redundancy and independent voltage control, monitoring, and protection functions provide separate control paths for both generator and inverter power controls as series elements. The control topologies described herein may have dissimilar and independent voltage control and protection functions to provide robust failure response to meet the needs of high integrity (e.g., flight safety) aircraft equipment.

Figure 1:
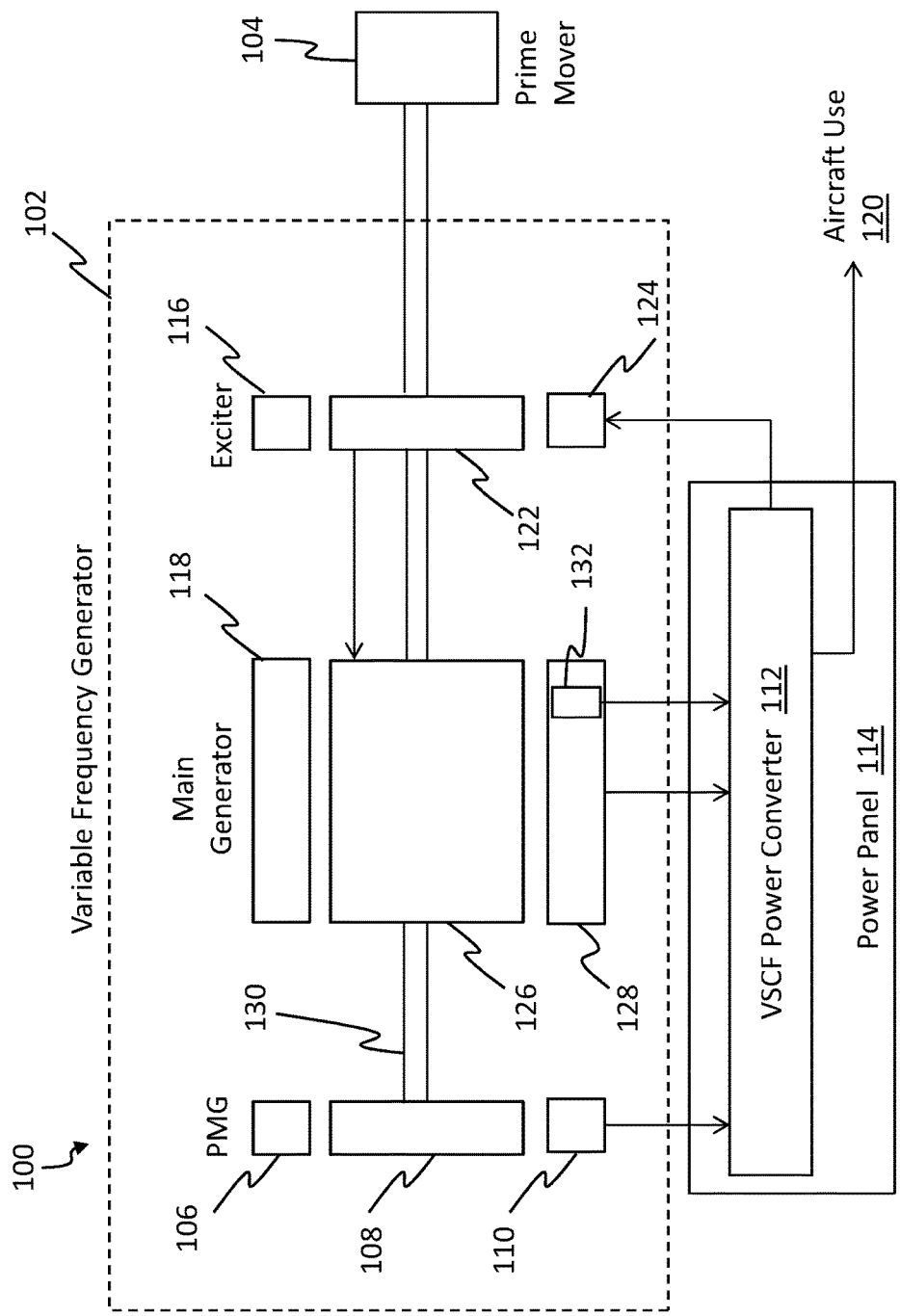
FIG. 1 is a schematic view of a variable-speed constant-frequency (VSCF) power system according to a non-limiting embodiment.

With reference now to FIG. 1, a VSCF power generating system 100 is illustrated according to a non-limiting embodiment. The VSCF power generating system 100 includes variable frequency generator (VFG) 102 that is driven by rotation of a prime mover 104, such as an aircraft engine operating a various speeds. In the example of FIG. 1, the VFG 102 includes a permanent magnet generator (PMG) 106 that comprises a rotating portion 108 and a stationary portion 110. The PMG 106 can include a plurality of permanent magnets and phase windings (not depicted) distributed between the rotating portion 108 and the stationary portion 110 to induce an electric current in response to the prime mover 104 driving the rotating portion 108 to rotate proximate to the stationary portion 110. A voltage produced by the PMG 106 can be output to a VSCF power converter 112, which may be a unit within a power panel 114 of an aircraft (e.g., within an aircraft fuselage). The voltage from the PMG 106 can be used to power control circuitry within the VSCF power converter 112. The VSCF power converter 112 controls an exciter 116 of the VFG 102 and regulates an output voltage of a main generator 118 of the VFG 102 at a variable frequency for an aircraft use 120.

The exciter 116 includes a rotating portion 122 and a stationary portion 124. Similarly, the main generator 118 includes a rotating portion 126 and a stationary portion 128. The rotation portion 108 of the PMG 106, the rotating portion 122 of the exciter 116, and the rotating portion 126 of the main generator 118 can all be coupled to a common shaft 130 in one or more segments driven by rotation of the prime mover 104 at varying speeds. In the example of FIG. 1, the rotating portion 122 of the exciter 116 is electrically coupled to the rotating portion 126 of the main generator 118. The VSCF power converter 112 controls an exciter current provided to the exciter 116, which can adjust the field strength of the main generator 118 to regulate an output voltage of the VFG 102 at stationary portion 128. Various sensors, such as a generator current sensor 132, can also be included for control and fault detection by the VSCF power converter 112.

Figure 2:
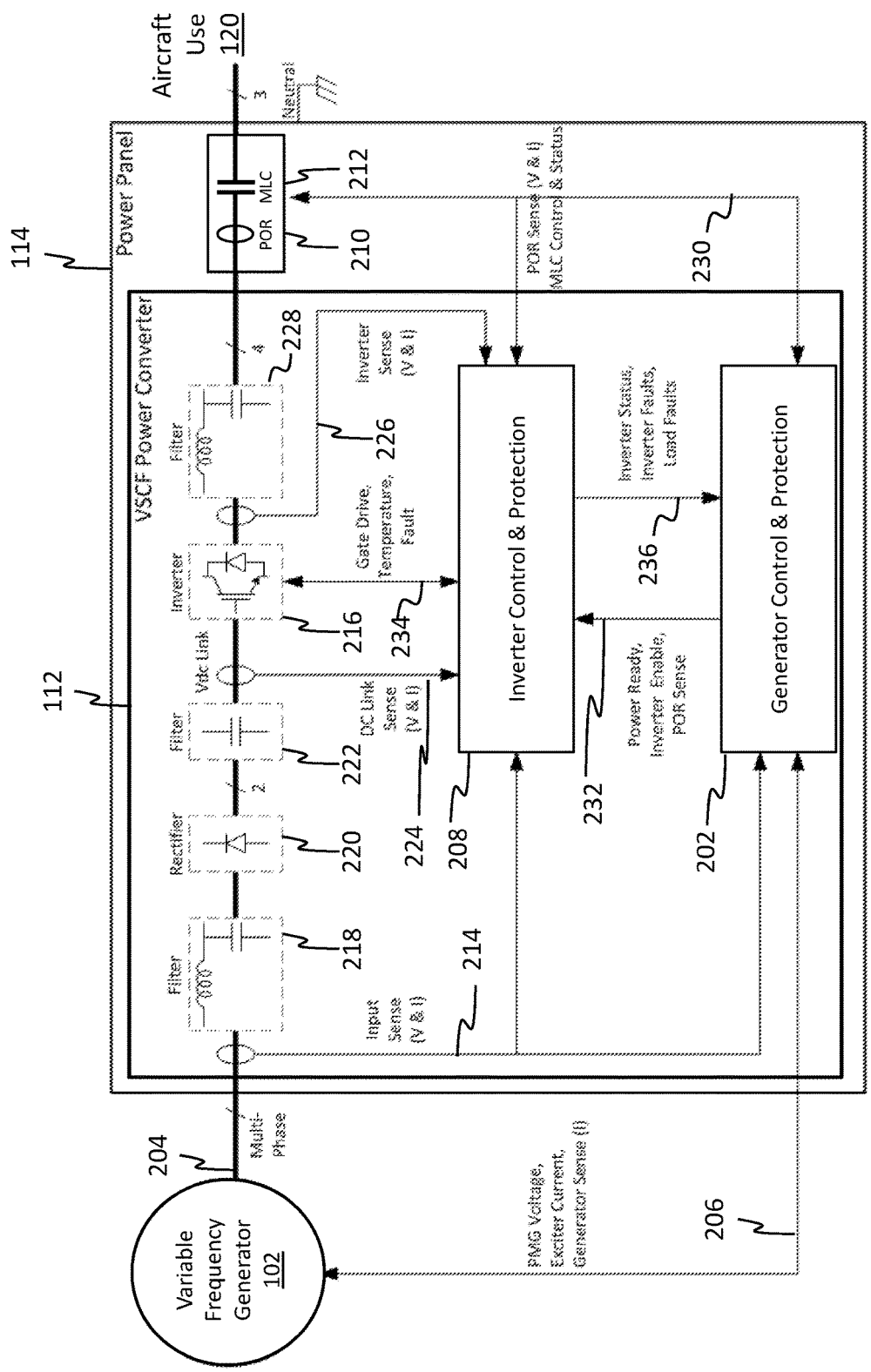
FIG. 2 illustrates a VSCF power converter in greater detail according to a non-limiting embodiment.

Referring now to FIG. 2, the VSCF power converter 112 of FIG. 1 is depicted in greater detail according to an embodiment. The VSCF power converter 112 includes a generator control 202 operable to regulate an output voltage of the VFG 102 at a variable frequency on feeder lines 204. The output voltage of the VFG 102 can be multi-phase (e.g., three or more phases) depending on the winding configuration used in the VFG 102. The generator control 202 can interface with the VFG 102 over multiple signal lines 206, for instance, to receive a PMG voltage from the PMG 106, source an exciter current to the exciter 116, and receive a sensed generator current from the generator current sensor 132 of the main generator 118. The VSCF power converter 112 also includes an inverter control 208 operable to regulate a VSCF output voltage at a point-of-regulation 210 at a constant frequency.

The generator control 202 and the inverter control 208 independently control a main line contactor 212 (e.g., a breaker) of the point-of-regulation 210 to provide redundant fault protection for the aircraft use 120. The generator control 202 and the inverter control 208 can act as series controls, where the generator control 202 monitors sensed inputs 214 indicative of a voltage and current output by the VFG 102 and actively adjusts the exciter current to regulate the output voltage of the VFG 102 within a predetermined range. The inverter control 208 also monitors sensed inputs 214 indicative of the voltage and current output by the VFG 102 and actively adjusts gate drive timing of an inverter 216 to regulate the output voltage at the point-of-regulation 210. The VSCF power converter 112 can also include a filter 218 to adjust power quality and filter electromagnetic interference of multi-phase output voltage of the VFG 102. A rectifier 220 (e.g., a multi-pulse rectifier) and filter 222 perform alternating current (AC) to direct current (DC) conversion and signal conditioning. The inverter control 208 can perform DC link voltage and current sensing 224 at a DC link between the filter 222 and inverter 216. The inverter control 208 can also perform voltage and current sensing 226 at one or more outputs of the inverter 216. The inverter 216 can include various architectures, such as a 2-level, 3-level, 3-legged with neutral forming transformer, 4-legged inverter to eliminate a heavy autotransformer, and/or other architectures known in the art. A filter 228 between the inverter 216 and point-of-regulation 210 can adjust power quality and filter electromagnetic interference of the constant frequency output of the VSCF power converter 112.

Point-of-regulation status (e.g., voltage and current) as well as main line contactor status can be provided on lines 230 from the point-of-regulation 210 and main line contactor 212 to the generator control 202 and the inverter control 208. If the lines 230 between the inverter control 208 and the point-of-regulation 210 and/or main line contactor 212 experience a fault or sustain damage, the generator control 202 can relay the information redundantly on line 232 as a backup. Lines 232 can be used to provide the inverter control 208 with redundant point-of-regulation status, to command enablement of the inverter control 208, and provide a power ready indication from the generator control 202 when the output of the VFG 204 is ready to use. The inverter control 208 can monitor temperature and faults in the inverter 216 and may dynamically adjust gate drive timing on lines 234 to the inverter 216 based on a required POR voltage, a DC conversion of the output voltage of the VFG 102 at a DC link and one or more outputs of the inverter 216. For instance, an amount of over or under voltage may be accommodated by adjusting gate drive timing (e.g., pulse width modulation timing) to the inverter 216. The inverter control 208 can provide an inverter status, inverter faults, load faults, and/or other information to the generator control 202 on lines 236. In some embodiments, faults detected by or received at the generator control 202 result in the generator control 202 inhibiting excitation power to prevent conditions such as over excitation or over/under frequency conditions, for example. Further, if a fault prevents the inverter control 208 from opening the main line contactor 212, the generator control 202 can open the main line contactor 212 to prevent a fault from propagating to the aircraft use 120 for an extended period of time. Similarly, if a generator control fault prevents the generator control 202 from being able to control the VFG 102 within a predetermined range, the inverter control 208 can open the main line contactor 212 if the inverter control 208 is unable to accommodate the fault.

The generator control 202 and the inverter control 208 can be implemented as separate modules of the VSCF power converter 112. As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Figure 3:
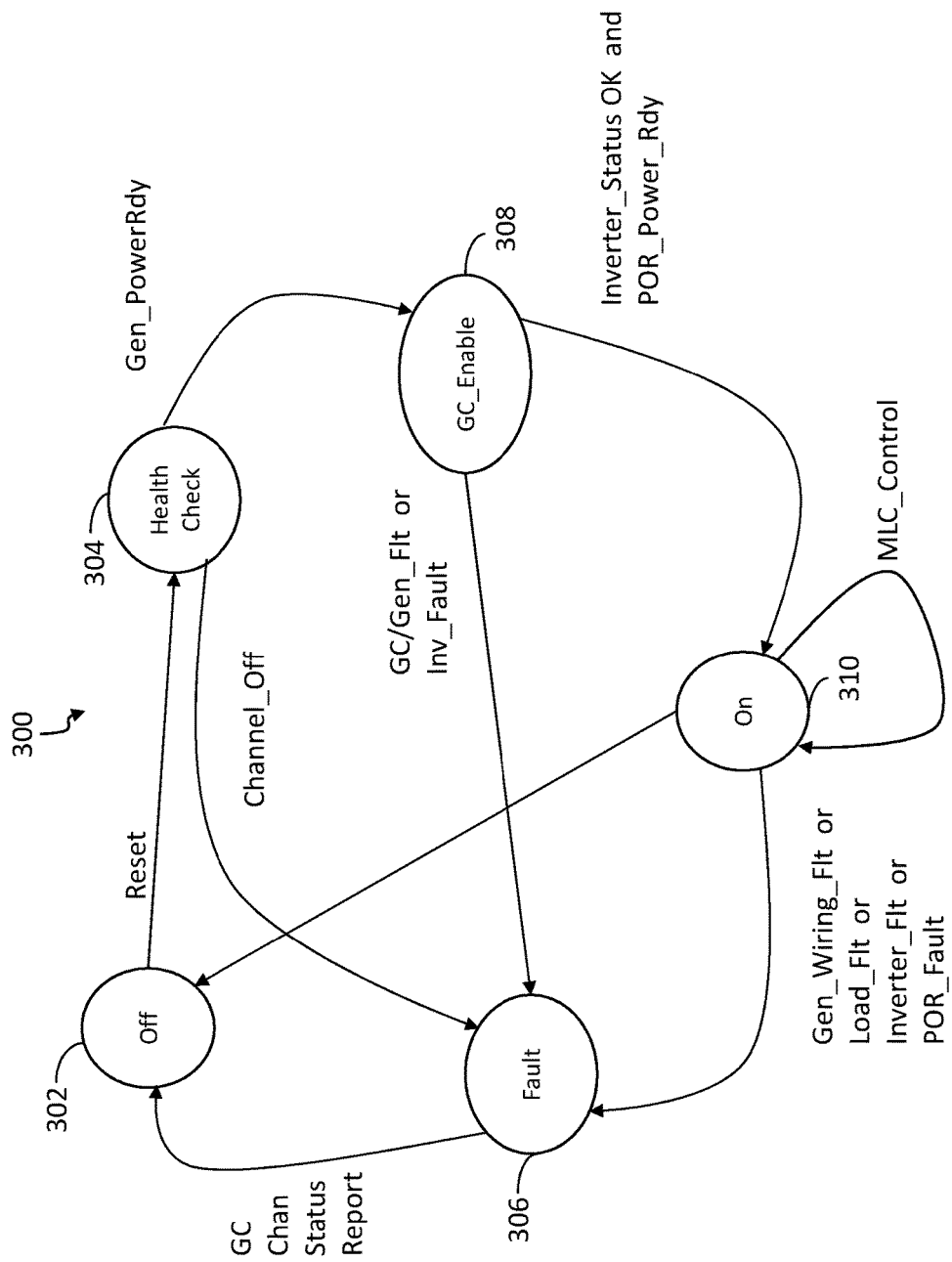
FIG. 3 is a state transition diagram of a generator control according to a non-limiting embodiment.

FIG. 3 depicts an example of a state transition diagram 300 that can be implemented within the generator control 202 of FIG. 2. The generator control 202 operates functionally independent of the inverter control 208 of FIG. 2, but signals generated by the generator control 202 can trigger transitions of the inverter control 208 and signals from the inverter control 208 can trigger transitions of the generator control 202. The generator control 202 is initially in an off state 302 and upon a reset, performs a health check 304. The health check 304 can include built-in checks of the generator control 202 and its associated hardware. The health check 304 can include monitoring values on signal lines 206 of FIG. 2, such as PMG voltage from the PMG 106 and a sensed generator current from the generator current sensor 132 of the main generator 118. If an unrecoverable fault is detected at the health check 304, the channel (e.g., system executing generator control 202) can be commanded off and a fault 306 asserted. When the fault 306 is asserted, the generator control 202 can output a status report (e.g., to a maintenance system) before transitioning to the off state 302. If the health check 304 is successful, the generator control 202 can indicate that generator power is ready and transition to GC enable state 308. The generator power ready indication can be sent on lines 232 to the inverter control 208 along with an inverter enable signal and currently sensed POR value. If the generator control 202 detects a GC fault or a generator fault or receives an inverter fault indication from the inverter control 208 on lines 236, the generator control 202 can transition from the GC enable state 308 to assert fault 306. If the generator control 202 receives an inverter status ok indication from the inverter control 208 and determines that POR power is ready based on values from lines 230, the generator control 202 transitions to an on state 310. In the on state 310, an MLC control command can be output from the generator control 202 on lines 230. If a generator wiring fault, load fault (e.g., from aircraft use 120), inverter fault, or POR fault is detected, the generator control 202 can assert a fault 306.

Figure 4:
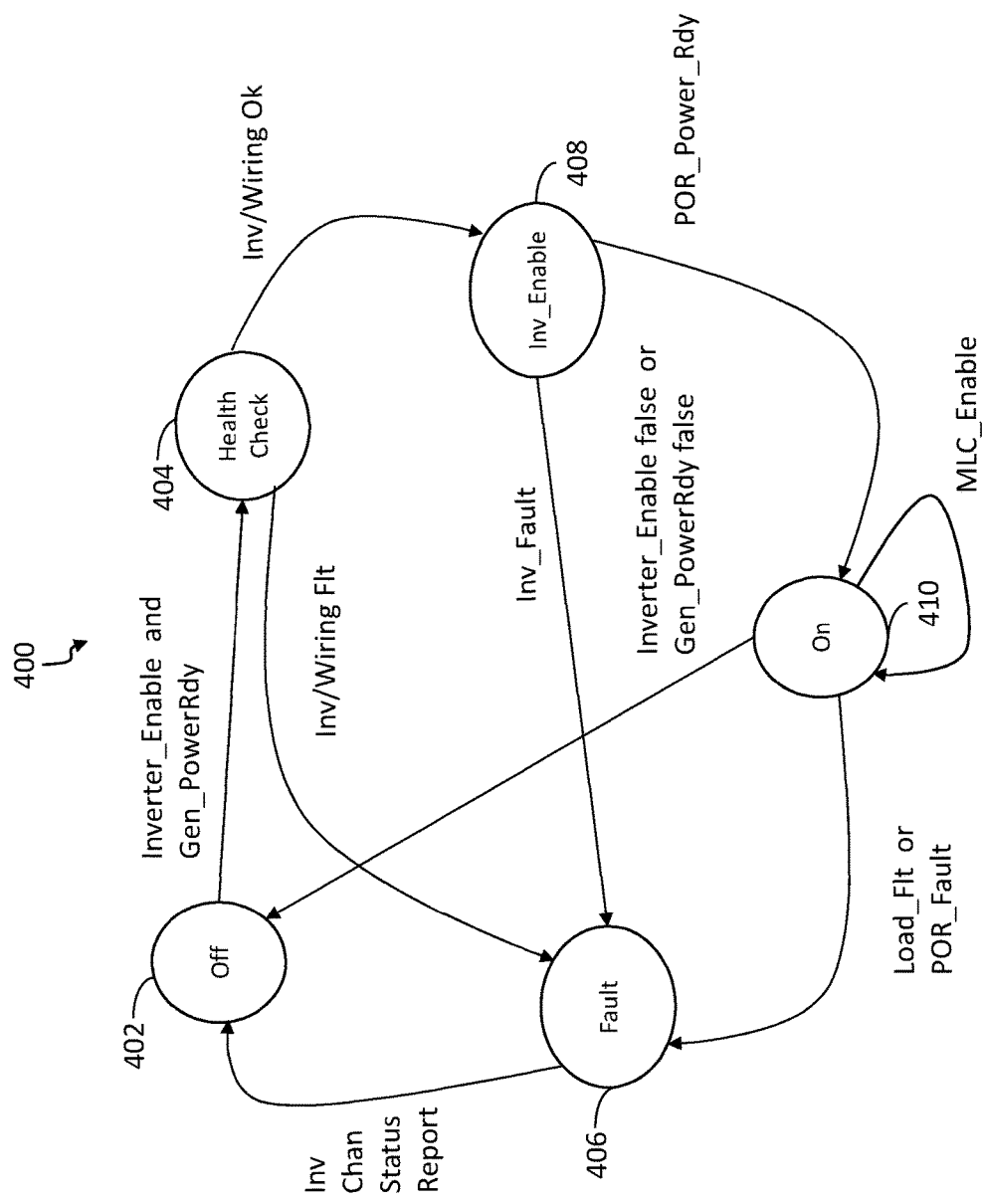
FIG. 4 is a state transition diagram of an inverter control according to a non-limiting embodiment.

FIG. 4 depicts an example of a state transition diagram 400 that can be implemented within the inverter control 208 of FIG. 2. The inverter control 208 is initially in an off state 402 and upon an inverter enable and generator power ready indication from the generator control 202 on lines 232, the inverter control 208 can perform a health check 404. The health check 404 can include checks of the inverter 216 and its associated wiring. The health check 404 can include monitoring values on signal lines 214, 224, 226, and 234 of FIG. 2. If an inverter or wiring fault is detected at the health check 404, a fault 406 is asserted. When the fault 406 is asserted, the inverter control 208 can output a status report (e.g., to a maintenance system) before transitioning to the off state 402. If the health check 404 is successful, the inverter control 208 can transition to inverter enable state 408 and indicate that the inverter status is ok to the generator control 202 on lines 236. If the inverter control 208 detects an inverter fault, the inverter control 208 can transition from the inverter enable state 408 to assert fault 406. If the inverter control 208 receives and/or determines that POR power is ready based on values from lines 230 and/or 232, the inverter control 208 transitions to an on state 410. In the on state 410, an MLC enable command can be output from the inverter control 208 on lines 230. The MLC enable command from the inverter control 208 and the MLC control command from the generator control 202 can control opening and closing of the the main line contactor 212 as an AND-gate function, where either the generator control 202 or the inverter control 208 can open the main line contactor 212 but both are used to close the main line contactor 212. If a load fault (e.g., from aircraft use 120), inverter fault, or POR fault is detected, the inverter control 208 can assert a fault 406.

Figure 5:
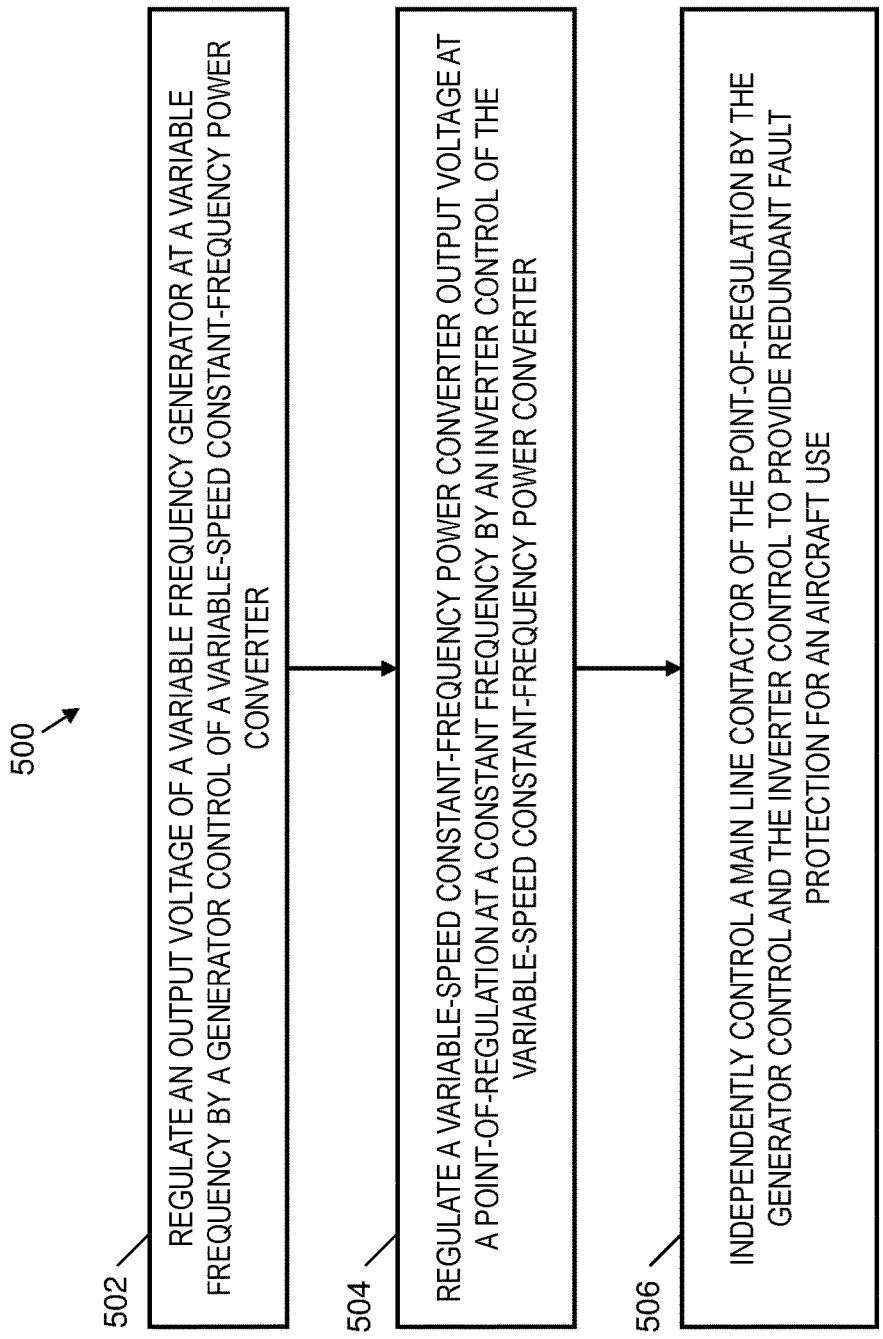
FIG. 5 is a flow diagram of a method according to a non-limiting embodiment.

FIG. 5 is a flow chart illustrating a method 500 for controlling a VSCF power converter 112 in accordance with an embodiment. The method 500 of FIG. 5 is described in reference to FIGS. 1-4 and may be performed with an alternate order and include additional steps. At block 502, an output voltage of a VFG 102 is regulated at a variable frequency by a generator control 202 of the VSCF power converter 112. At block 504, a VSCF power converter output voltage is regulated at a point-of-regulation 210 at a constant frequency by an inverter control 208 of the VSCF power converter 112. At block 506, a main line contactor 212 of the point-of-regulation 210 is independently controlled by the generator control 202 and the inverter control 208 to provide redundant fault protection for an aircraft use 120. The generator control 202 can adjust an exciter current of the VFG 102 to maintain the output voltage of the VFG 102 within a predetermined voltage range. The inverter control 208 can dynamically adjust gate drive timing to the inverter 216 based on a required POR voltage, DC conversion of the output voltage of the VFG 102 at a DC link and one or more outputs of the inverter 102. A redundant point-of-regulation status can be provided from the generator control 202 to the inverter control 208. An inverter status, inverter faults, and load faults from the inverter control 208 can be provided to the generator control 202. The generator control 202 can also control enablement of the inverter control 208. The output voltage of the VFG 102 can be a multi-phase voltage, and the VSCF output voltage may be a three phase voltage.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A variable-speed constant-frequency (VSCF) power converter, comprising:
   a generator control operable to regulate an output voltage of a variable frequency generator at a variable frequency; and
   an inverter control operable to regulate a VSCF output voltage at a point-of-regulation at a constant frequency, wherein the generator control and the inverter control independently control a main line contactor of the point-of-regulation as an AND-gate function to provide redundant fault protection for an aircraft use, wherein the main line contactor is opened responsive to either the generator control or the inverter control, and the main line contactor is closed when commanded by both of the generator control and the inverter control.

2. The VSCF power converter of claim 1, wherein the generator control adjusts an exciter current of the variable frequency generator to maintain the output voltage of the variable frequency generator within a predetermined voltage range.

3. The VSCF power converter of claim 2, wherein the inverter control dynamically adjusts gate drive timing to an inverter based on a direct current (DC) conversion of the output voltage of the variable frequency generator at a DC link and one or more outputs of the inverter.

4. The VSCF power converter of claim 1, wherein the generator control provides a redundant point-of-regulation status to the inverter control as a backup in case of a fault or damage to one or more lines providing a point-of-regulation status between the point-of-regulation and the inverter control.

5. The VSCF power converter of claim 4, wherein the inverter control provides an inverter status, inverter faults, and load faults to the generator control.

6. The VSCF power converter of claim 1, wherein the generator control commands enablement of the inverter control.

7. The VSCF power converter of claim 1, wherein the output voltage of the variable frequency generator is a multi-phase voltage and the VSCF output voltage is a three phase voltage.

8. A variable-speed constant-frequency (VSCF) power generating system comprising:
a variable frequency generator; and
a VSCF power converter in an aircraft power panel, the VSCF power converter comprising:
a generator control operable to regulate an output voltage of the variable frequency generator at a variable frequency; and
an inverter control operable to regulate a VSCF output voltage at a point-of-regulation of the aircraft power panel at a constant frequency, wherein the generator control and the inverter control independently control a main line contactor of the point-of-regulation as an AND-gate function to provide redundant fault protection for an aircraft use, wherein the main line contactor is opened responsive to either the generator control or the inverter control, and the main line contactor is closed when commanded by both of the generator control and the inverter control.

9. The VSCF power generating system of claim 8, wherein the generator control adjusts an exciter current of the variable frequency generator to maintain the output voltage of the variable frequency generator within a predetermined voltage range.

10. The VSCF power generating system of claim 9, wherein the inverter control dynamically adjusts gate drive timing to an inverter based on a required point-of-regulation voltage, direct current (DC) conversion of the output voltage of the variable frequency generator at a DC link, and one or more outputs of the inverter.

11. The VSCF power generating system of claim 8, wherein the generator control provides a redundant point-of-regulation status to the inverter control as a backup in case of a fault or damage to one or more lines providing a point-of-regulation status between the point-of-regulation and the inverter control.

12. The VSCF power generating system of claim 11, wherein the inverter control provides inverter status, inverter faults, and load faults to the generator control.

13. The VSCF power generating system of claim 8, wherein the generator control commands enablement of the inverter control.

14. The VSCF power generating system of claim 8, wherein the output voltage of the variable frequency generator is a multi-phase voltage and the VSCF output voltage is a three phase voltage.

15. A method of controlling a variable-speed constant-frequency (VSCF) power converter, the method comprising:
regulating an output voltage of a variable frequency generator at a variable frequency by a generator control of the VSCF power converter;
regulating a VSCF power converter output voltage at a point-of-regulation at a constant frequency by an inverter control of the VSCF power converter; and
independently controlling a main line contactor of the point-of-regulation by the generator control and the inverter control as an AND-gate function to provide redundant fault protection for an aircraft use, wherein the main line contactor is opened responsive to either the generator control or the inverter control, and the main line contactor is closed when commanded by both of the generator control and the inverter control.

16. The method of claim 15, further comprising:
adjusting, by the generator control, an exciter current of the variable frequency generator to maintain the output voltage of the variable frequency generator within a predetermined voltage range.

17. The method of claim 16, further comprising:
dynamically adjusting, by the inverter control, gate drive timing to an inverter based on a required point-of-regulation voltage, a direct current (DC) conversion of the output voltage of the variable frequency generator at a DC link and one or more outputs of the inverter.

18. The method of claim 15, further comprising:
providing a redundant point-of-regulation status from the generator control to the inverter control as a backup in case of a fault or damage to one or more lines providing a point-of-regulation status between the point-of-regulation and the inverter control; and
providing an inverter status, inverter faults, and load faults from the inverter control to the generator control.

19. The method of claim 15, further comprising controlling enablement of the inverter control by the generator control.

20. The method of claim 15, wherein the output voltage of the variable frequency generator is a multi-phase voltage and the VSCF output voltage is a three phase voltage.

* * * * *